Sept. 3, 1940.　　　　A. J. MATHIEU　　　　2,213,605
WHEEL INSPECTING DEVICE
Filed May 29, 1937　　　2 Sheets-Sheet 1
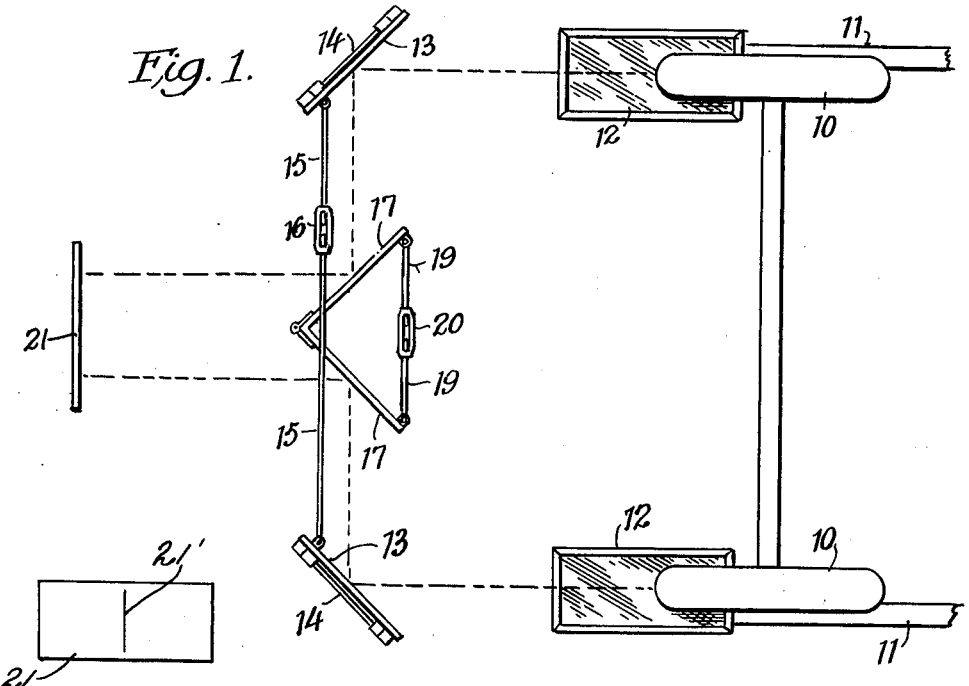
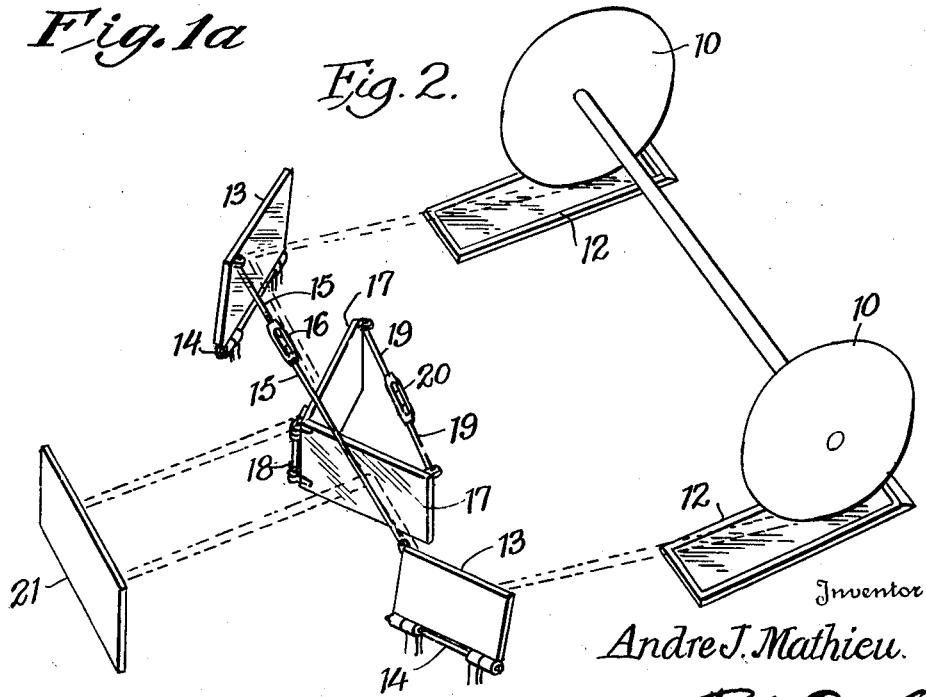
Inventor
Andre J. Mathieu.
By
Attorney

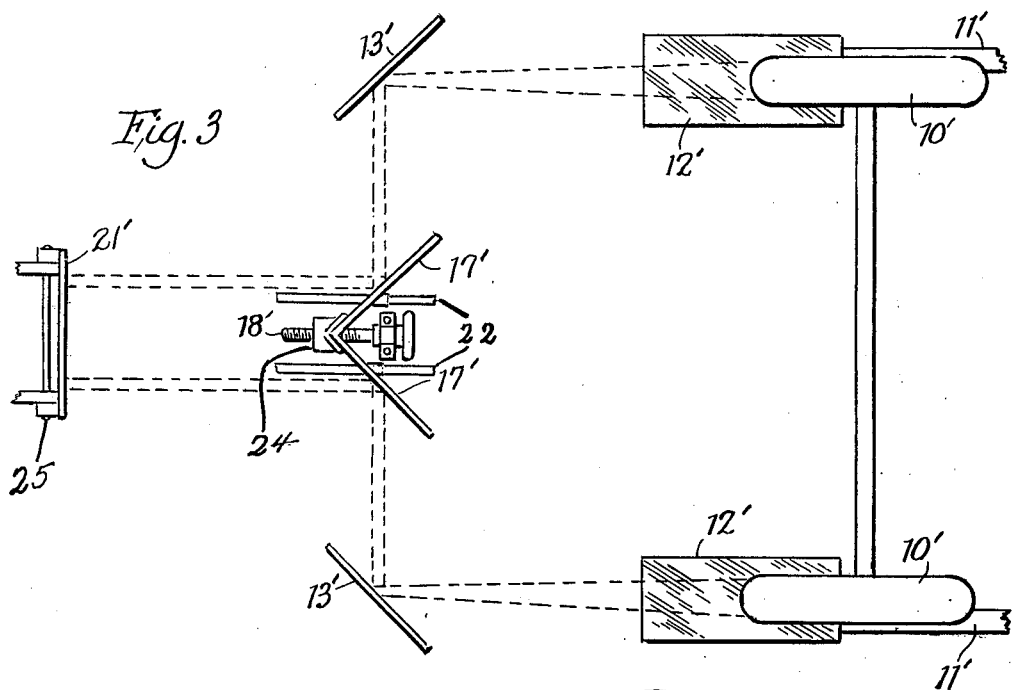
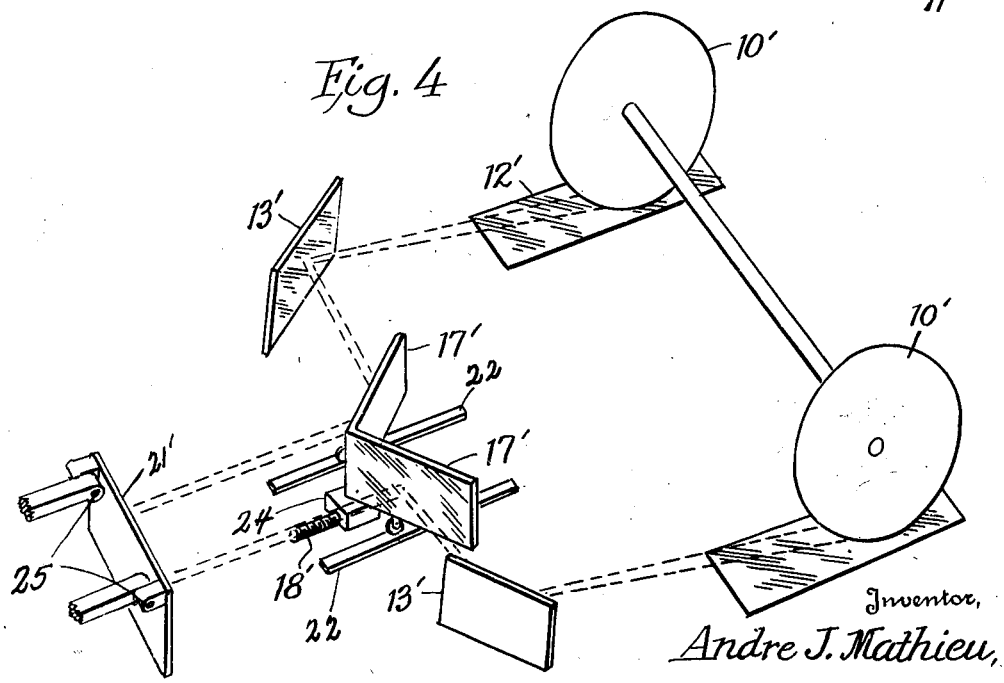

UNITED STATES PATENT OFFICE 2,213,605

WHEEL INSPECTING DEVICE

Andre J. Mathieu, Miami, Fla.

Application May 29, 1937, Serial No. 145,590

9 Claims. (Cl. 88—14)

My invention relates to an apparatus for indicating visually and in clear and convenient manner the relations between vehicle wheels, specifically between the front wheels of a motor vehicle, in order to afford a repair man or automobile mechanic who may be testing the car a clear and accurate indication of the condition of the wheels both in preliminary tests and in the course of making such adjustments as may be found necessary to provide for proper toe-in, camber and caster of the wheels, and to insure correct follow of the rear wheels where repairs may be called for as the result of frame distortion or spring distortion.

It is an object of my invention to provide means for the purpose indicated which shall be cheap and simple in construction, yet accurate and reliable; which can be quickly and correctly set up and quickly demounted, if necessary; which can be used for any of the purposes above set forth, or can readily be set up for testing only for toe-in where other possible uses are not desired; and other objects and advantages will be apparent upon consideration of the sub-joined description and of the drawings which are hereby made a part of this application, in all of which similar reference characters indicate similar parts.

Referring now to the drawings:

Fig. 1 is a somewhat diagrammatic plan of a form of the invention;

Fig. 1a, a face view of a part shown in Fig. 1;

Fig. 2, a perspective with added details; and

Figs. 3 and 4, similar views of a modified form of the invention.

In the drawings, reference character 10 indicates the front wheels of a vehicle, guided on a floor by wheel guards 11, 11 to proper position with reference to the testing means, and to a pair of mirrors 12, 12 usually flush with the floor. The wheels may be run up on said mirrors as far as desired, but preferably only so far that a perpendicular line through the axis of each intersects the rear edge of the corresponding mirror 12.

At a point some distance in advance of each mirror 12 there is another mirror 13. The mirrors 13 may have their reflecting faces next to the wheels arranged in vertical planes and the mirrors 12 may be omitted, but the preferred form of my invention is as shown in the drawings, with the mirrors 13 mounted on pivots 14 at their lower edges so that they can be adjusted to face the wheels in vertical arrangement or be inclined downwardly to receive the images of the wheels from the mirrors 12, 12.

When the mirrors 13 are so mounted they are preferably connected by means comprising rods 15 and turnbuckle 16 for adjusting the rods and therefore the mirrors to which the rods are connected at their upper edges by ball-and-socket or other suitable swiveling connections.

Intermediate between the mirrors 13, 13 there are mirrors of another set at 17, 17 pivotally connected to each other at 18, these mirrors having their reflecting faces directed toward those of the mirrors 13, 13 respectively and being connected to each other at their free ends by means of rods 19, 19 and a turnbuckle 20 whereby the angle between the mirrors 17, 17 may be adjusted.

An image receiving device 21 is mounted in suitable manner at a suitable distance in advance of the mirrors 17, 17, so that it may receive the images reflected to the respective mirrors 17, 17 by the respective mirrors 13, 13. Obviously this device may be a mirror or other suitable device, such as a screen of ground glass, and by adjustment of the mirrors 17, 17 the images may be superposed on the receiving device, or suitable graduations or scores may be provided on the same, as at 21' on element 21 and the reflections of the wheels be brought into appropriate relation thereto for the necessary study and adjustments.

It will be obvious that with the arrangements shown in the drawings the mirrors 17, 17 will be adjusted equally and simultaneously, and the same is true of the mirrors 13, 13. In such an arrangement the mirrors 13, 13 are of course in a more elevated position than mirrors 12, 12, which are preferably at the floor level, while mirrors 17, 17 and the reflecting device 21 will be somewhat lower than mirrors 13, 13, or these parts may be wider than mirrors 13, 13 in a vertical direction. Preferably the mirrors 17, 17 and the reflecting device 21 will be at the same level.

In the modified form of the invention shown in Figs. 3 and 4 the parts 10', 11', 12', 13', 17', and 21' may be as in the form first described, with the following exceptions: the mirrors 13' are each fixed in position; the mirrors 17', 17' are rigidly fastened together at their meeting edges and are mounted for sliding movement on tracks 22, 22, on which they are moved by means of a screw engaging a nut fast to the mirrors, the screw being indicated at 18' and the nut at 24; the reflector or scored glass plate 21' is pivotally mounted at 25; and thus the mechanism is simplified. Obviously other means may be substituted for the screw and nut, etc.

With this arrangement the mirrors 17', 17' can be moved toward and from the mirror 21' to widen or narrow the reflection, thus eliminating the rods and turnbuckles.

It is contemplated that equivalent means may be used, as by substituting prisms for mirrors, etc., and other changes will be obvious to those skilled in the art, such as may be made without departing from the spirit of the invention. Therefore I do not limit myself to what is shown in the drawings and described in the specification, but only as indicated in the appended claims.

Having thus fully described my invention, what I claim is:

1. Apparatus for indicating the camber, caster and toe-in of vehicle wheels comprising a pair of mirrors at the level of the wheel-supporting surface each positioned to reflect an image of one of a pair of wheels, said mirrors being spaced apart a distance substantially equal to that between the front wheels of a vehicle, a pair of mirrors spaced from the first-named mirrors and from each other and inclined toward each other, a third pair of mirrors located between the mirrors of the second-named pair and inclined away from each other, an image-receiving device spaced from the third pair of mirrors, said mirrors and receiving device being so positioned that each mirror of the second pair receives an image from the adjacent mirror of the first pair and reflects it to the adjacent mirror of the third pair, said last-named mirrors each reflecting the image to said image-receiving device.

2. An apparatus as in claim 1, including means for adjusting the mirrors of the third pair to vary the relative positions of the images reflected therefrom.

3. An apparatus as in claim 1, the mirrors of the said third pair being hinged together, and means for adjusting them about such hinge to vary the relative positions of the wheel images on said receiving device.

4. An apparatus as in claim 1, the mirrors of the third pair being hinged together, and means connected to the mirrors of said third pair for moving them equally and simultaneously about said hinge into various positions of adjustment.

5. An apparatus as in claim 1, including means for adjusting the mirrors of the third pair equally and simultaneously to vary the relative positions of the images on said receiving device.

6. An apparatus as in claim 1, including means for adjusting the mirrors of the second-named pair into either vertical or downwardly-inclined position.

7. An apparatus as in claim 1, including horizontal pivots for the mirrors of the second pair, and means whereby such mirrors may be adjusted about said pivots.

8. An apparatus as in claim 1, including horizontal pivots for the mirrors of the second pair, and adjustable connections between said mirrors of the second pair providing for equal and simultaneous movement of said mirrors about their respective pivots when adjusted.

9. In an apparatus for inspecting a pair of vehicle wheels and indicating their relative positions, a first pair of mirrors, positioned at a distance from each other substantially equal to the distance between the front pair of vehicle wheels to be inspected and in substantial horizontal alignment therewith, said mirrors being each in a plane at an angle of approximately 45° with respect to the plane of the respective front wheel a second pair of mirrors positioned between the first pair of mirrors, each mirror of said second pair being substantially parallel to the adjacent mirror of the first pair, an image receiving device in substantial horizontal alignment with and at the side of the second pair of mirrors remote from the vehicle wheels, said image receiving device having indicating means thereon, said image receiving device being positioned to receive images reflected from said second pair of mirrors, and common means for adjusting the mirrors of said second pair so as to move the images reflected therefrom toward and away from each other.

ANDRE J. MATHIEU.